United States Patent
Boucher et al.

(10) Patent No.: US 9,250,683 B2
(45) Date of Patent: Feb. 2, 2016

(54) SYSTEM, METHOD, AND COMPUTER PROGRAM PRODUCT FOR ALLOWING A HEAD TO ENTER A REDUCED POWER MODE

(71) Applicant: NVIDIA Corporation, Santa Clara, CA (US)

(72) Inventors: Eric Michel Boucher, Los Gatos, CA (US); Dustin James Rubin, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 372 days.

(21) Appl. No.: 13/830,689

(22) Filed: Mar. 14, 2013

(65) Prior Publication Data
US 2014/0281603 A1   Sep. 18, 2014

(51) Int. Cl.
*G06F 1/32* (2006.01)
*G06F 3/14* (2006.01)
*G06F 9/44* (2006.01)

(52) U.S. Cl.
CPC ............... *G06F 1/3206* (2013.01); *G06F 1/32* (2013.01); *G06F 1/3203* (2013.01); *G06F 1/3234* (2013.01); *G06F 1/3243* (2013.01); *G06F 1/3246* (2013.01); *G06F 1/3253* (2013.01); *G06F 1/3287* (2013.01); *G06F 3/14* (2013.01); *G06F 3/1438* (2013.01); *G06F 3/1446* (2013.01); *G06F 9/4418* (2013.01); *G09G 2330/021* (2013.01); *G09G 2360/06* (2013.01); *G09G 2360/08* (2013.01)

(58) Field of Classification Search
USPC .......................................... 713/320, 323–324
See application file for complete search history.

(56) References Cited

U.S. PATENT DOCUMENTS

| | | | | |
|---|---|---|---|---|
| 6,104,414 A | * | 8/2000 | Odryna | G06F 3/14 345/1.3 |
| 6,333,750 B1 | * | 12/2001 | Odryna | G06F 3/14 345/1.1 |
| 6,938,176 B1 | * | 8/2005 | Alben | G06F 1/10 713/300 |
| 7,095,386 B2 | | 8/2006 | Alben et al. | |
| 8,130,227 B2 | | 3/2012 | Johnson et al. | |
| 2010/0097404 A1 | * | 4/2010 | Hata | G09G 3/3406 345/690 |
| 2014/0281603 A1 | * | 9/2014 | Boucher et al. | 713/320 |

* cited by examiner

*Primary Examiner* — Tanh Nguyen
(74) *Attorney, Agent, or Firm* — Zilka-Kotab, PC

(57) ABSTRACT

A system, method, and computer program product are provided for allowing a head to enter a reduced power mode. A first processor having a first head is provided. Additionally, a second processor having a second head is provided. Furthermore, a link is provided, coupled between the first head of the first processor and the second head of the second processor for communicating first data therebetween. In operation, at least the second head of the second processor is capable of entering a reduced power mode.

20 Claims, 10 Drawing Sheets

SYSTEM, METHOD, AND COMPUTER PROGRAM PRODUCT FOR ALLOWING A HEAD TO ENTER A REDUCED POWER MODE

FIELD OF THE INVENTION

The present invention relates to multi-processor systems, and more particularly to power saving techniques for use with multi-processor systems.

BACKGROUND

In multi-processor systems, multiple processors may be connected via one or more video bridges. During use, the bridge may be utilized for use of one or more additional processors for distributed processing. Currently, input/output resources of the one or more additional processors may be disabled when distributed processing is not being utilized. However, a head of such one or more additional processors remains enabled even when distributed processing is not being utilized, resulting in wasted power.

There is thus a need for addressing these and/or other issues associated with the prior art.

SUMMARY

A system, method, and computer program product are provided for allowing a head to enter a reduced power mode. A first processor having a first head is provided. Additionally, a second processor having a second head is provided. Furthermore, a link is provided, coupled between the first head of the first processor and the second head of the second processor for communicating first data therebetween. In operation, at least the second head of the second processor is capable of entering a reduced power mode.

DETAILED DESCRIPTION

Figure 1:
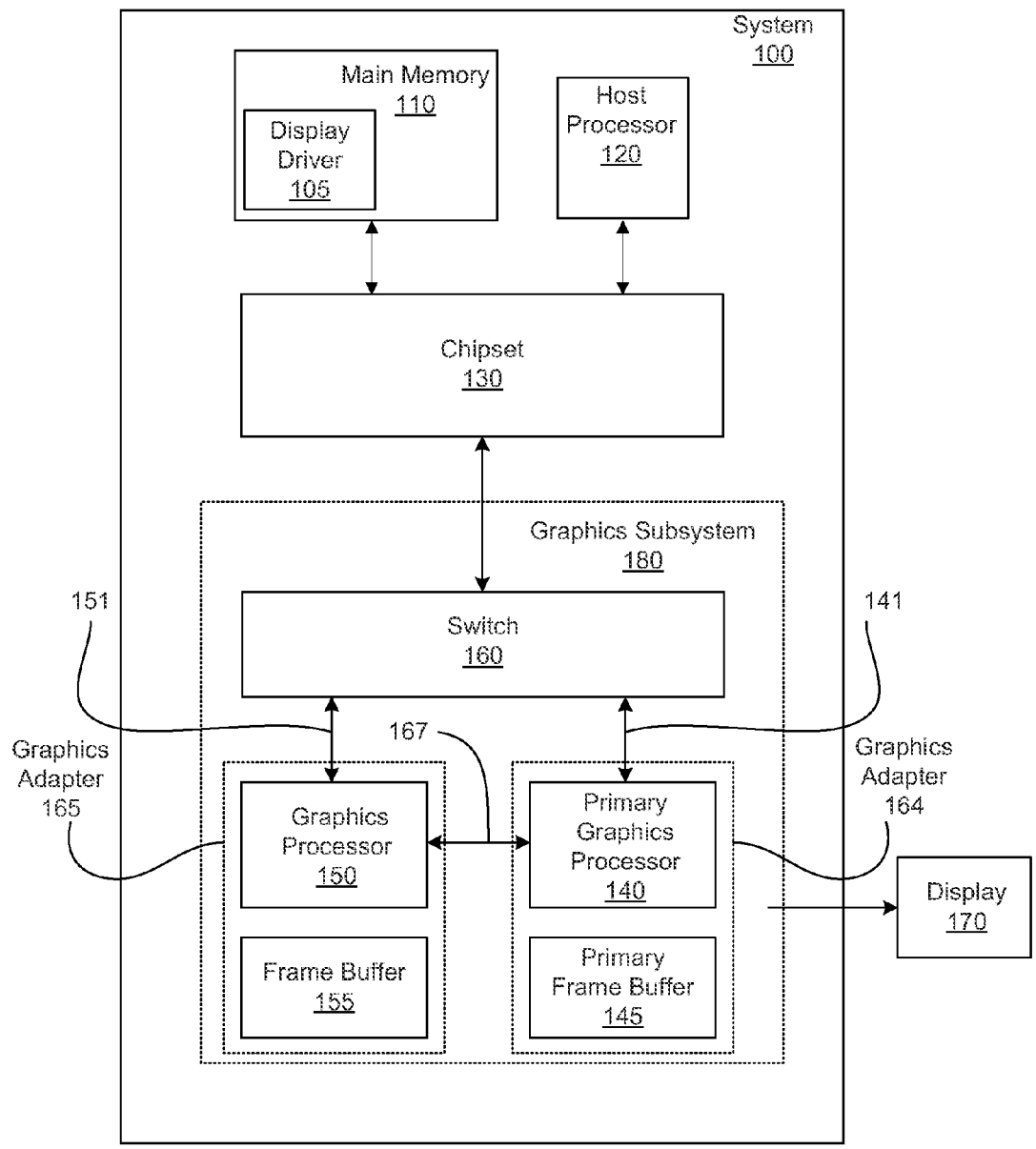
FIG. 1 is an exemplary embodiment of a graphics processing system including multiple graphics devices, in accordance with one embodiment.

FIG. 1 is an exemplary embodiment of a graphics processing system 100 including multiple graphics devices, in accordance with one embodiment. In various embodiments, the system 100 may be a desktop computer, a server, a laptop computer, a palm-sized computer, a tablet computer, a game console, a cellular telephone, a hand-held device, a computer based simulator, or the like. As shown, the system 100 includes a host processor 120, a main memory 110, and a chipset 130 that is coupled (e.g. directly, indirectly, etc.) to a graphics subsystem 180. The graphics subsystem 180 includes a switch 160, and multiple graphics devices, such as a graphics adapter 164 and another graphics adapter 165. Of course, in various embodiments, one or more graphics adapters may be present.

In operation, a display driver 105, stored within the main memory 110, may configure the devices within the graphics subsystem 180 and may communicate between applications executed by the host processor 120 and the graphics adapters 165 and 164. In one embodiment, one display driver may be used for each graphics adapter installed in the system 100.

In some embodiments, the chipset 130 may include a system memory switch and an input/output (I/O) switch that may include several interfaces such as, an Advanced Technology Attachment (ATA) bus, a Universal Serial Bus (USB), a Peripheral component interface (PCI), or the like. The switch 160 provides an interface between the chipset 130 and each of the graphics adapters 165 and 164 when a first port and a second port of the switch 160 are coupled to a connection 151 and a connection 141, respectively. In some embodiments of the switch 160, the switch 160 provides an indirect interface between the graphics adapter 165 and the graphics adapter 164 through the combination of the connections 151 and 141. A link 167 provides a connection (e.g. a direct connection, etc.) between the graphics adapter 165 and the graphics adapter 164. In various embodiments, the switch 160 may also include interfaces to other devices.

In one embodiment, the functionality provided by the switch 160 may be integrated into the chipset 130 and the chipset 130 may interface directly with multiple graphics adapters. Additionally, in some embodiments, transfers over the connections 141 and 151 may be performed using an industry standard protocol such as PCI-Express, and, in such cases, the switch 160, the graphics adapter 165 and the graphics adapter 164, may each include an interface unit corresponding to the industry standard protocol.

As shown in FIG. 1, a primary graphics processor 140 within the graphics adapter 164 may be configured to output image data to a display 170. The display 170 may include one or more display devices, such as a cathode ray tube (CRT), flat panel display, and/or any other type of display. The primary graphics processor 140 within the graphics adapter 164 is also coupled to a primary frame buffer 145, which may be used to store graphics data, image data, and program instructions. A graphics processor 150 within the graphics adapter 165 is coupled to a frame buffer 155, which may also be used to store graphics data, image data, and program instructions. In various embodiments, the graphics adapter 164 may include two or more graphics processors. The graphics adapter 164 and the graphics adapter 165 may each be capable of providing image data to two or more displays. As shown in FIG. 1, the graphics processor 150 is configured to output image data to the display 170 via the primary graphics processor 140.

An example of a multi-adapter configuration is a scalable link interface (SLI) configuration that permits multiple graphics devices to produce and combine image data for a single display device (or a group of display devices serving as a single display device, etc.). In various embodiments, the SLI configuration functionality may be provided via the switch 160 and/or via the link 167. Additional graphics adapters may be included within the graphics subsystem 180 and may be coupled to each other in a chain that is coupled to the graphics processor 150, thereby providing the scalable feature of the SLI configuration.

In one embodiment, the multi-adapter configuration may be fixed when the system 100 is manufactured. For example, the multi-adapter configuration information may be fixed by providing hardwired inputs to each graphics processor. In other embodiments, the multi-adapter configuration information may be dynamic and may be updated when a second or additional graphics adapter is installed in the system 100 or may be changed by a user via a control panel. In one embodiment, the multi-adapter configuration information may include an indication that one of the multiple graphics devices, such as the graphics adapter 164 is a primary (e.g. a master, etc.) graphics device that generates an output to the display 170.

In one embodiment, the display driver 105 may configure the graphics processor 150 and the primary graphics processor 140 such that the graphics processing workload performed by the system 100 is divided between the graphics processor 150 and the primary graphics processor 140 to produce the image data. For example, in one embodiment, the graphics processor 150 may process a larger portion of an image than the primary graphics processor 140. In some embodiments, the graphics processor 150 may process the entire image and the primary graphics processor 140 may receive the image data from the graphics processor 150 via the SLI. In other embodiments, the host processor 120 may control the transfer of the image data from the graphics processor 150 to the primary graphics processor 140.

Although the system 100 is shown as a graphics processing system, alternate embodiments of the system 100 may process other types of data, such as audio data, multi-media data, and/or any other type of data. For example, in various embodiments, the graphics processor 150 and the primary graphics processor 140 may be replaced with other appropriate data processing devices. Likewise, in various embodiments, the display driver 105 may be replaced with a device driver corresponding to the data processing device.

In one embodiment, the system 100 may be operable such that a head associated with the graphics processor 150 (or another processor, etc.) is capable of entering a reduced power mode.

Figure 2:
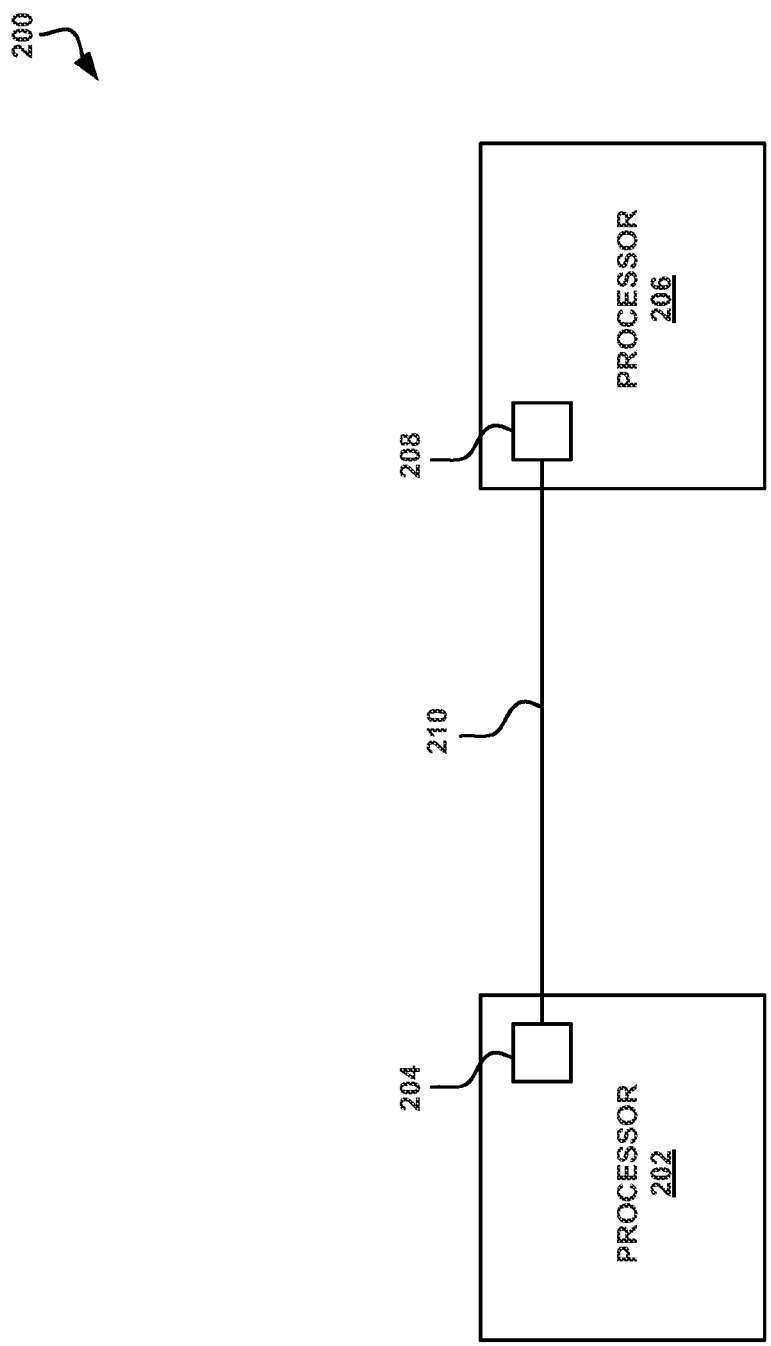
FIG. 2 shows an apparatus for allowing a head to enter a reduced power mode, in accordance with one embodiment.

FIG. 2 shows an apparatus 200 for allowing a head to enter a reduced power mode, in accordance with one embodiment. As an option, the apparatus 200 may be implemented in the context of FIG. 1 or any subsequent Figure(s). Of course, however, the apparatus 200 may be implemented in any desired environment. It should also be noted that the aforementioned definitions may apply during the present description.

As shown, the apparatus 200 includes a first processor 202 having a first head 204. Additionally, the apparatus 200 includes a second processor 206 having a second head 208. Further, the apparatus includes a link 210 coupled between the first head 204 of the first processor 202 and the second head 208 of the second processor 206 for communicating first data therebetween. In use, the apparatus 200 is operable such that at least the second head 208 of the second processor 206 is capable of entering a reduced power mode.

In the context of the present description, a head refers to one or more components associated with a processor, system, or sub-system that is capable of being utilized to drive at least one display by communicating display data and/or signals. Just by way of example, in the case of a graphics processor, the head associated with the graphics processor may include circuitry capable of be utilized to scan out images from memory. In one embodiment, the head may be in communication with (e.g. coupled to, etc.) one or more output resources of the processor.

In various embodiments, the processors 202 and 206 may include graphics processors, central processing units (CPUs), and/or various other processing devices. For example, in one embodiment, the first processor 202 may include a first graphics processor and the second processor 206 may include a second graphics processor. In another embodiment, the first processor 202 may include a first central processing unit and the second processor 206 may include a second central processing unit.

Further, in various embodiments, the processors 202 and 206 may be positioned on the same board or positioned on a different board (e.g. the same motherboard, a different motherboard—in various systems including, but not limited to multiple extension board systems, which can potentially be sandwiched together with a PCI-E bridge chip and share a single PCI-E slot on the motherboard, etc.). For example, in one embodiment, the apparatus 200 may include a first board to which the first processor 202 is coupled and a second board to which the second processor 206 is coupled. In another embodiment, the apparatus may include a single board to which the first processor 202 and the second processor 206 are coupled.

Additionally, in various embodiments, any number of processors may be present. For example, in one embodiment, the apparatus 200 may include a third processor having a third head (not shown) and another link (not shown) coupled between the second head 208 of the second processor 206 and the third head of the third processor for communicating second data therebetween. In this case, in one embodiment, at least the third head of the third processor may be capable of entering the reduced power mode. Of course, in various embodiments, any number of processors may be present (e.g. 4, etc.). In these cases, heads associated with the additional processors may be capable of entering the reduced power mode.

In the context of the present description, a head reduced power mode refers to any mode where a head of a processor is consuming less power than the head would during a normal operating mode (e.g. a powered mode, etc.). For example, in one embodiment, the second head 208 of the second processor 206 may be deactivated when the head reduced power mode is entered. In another embodiment, the second head 208 of the second processor 206 may avoid power consumption when the head reduced power mode is entered.

Further, in one embodiment, a plurality of commands may be issued when the reduced power mode is entered (e.g. issued by the processor, the head, a master processor, a driver, etc.). For example, in one embodiment, a first command for deactivating a plurality of channels associated with the second head 208 may be issued when the second head 208 enters the reduced power mode. Additionally, in one embodiment, a second command for deactivating a cursor in association with the second head 208 may be issued when the second head 208 enters the reduced power mode. In another embodiment, a third command for deactivating color transformation in association with the second head 208 may be issued when the second head 208 enters the reduced power mode. Still yet, in one embodiment, a fourth command for deactivating data scan out from memory may be issued when the second head 208 enters the reduced power mode. In other embodiments, one or more commands may be used to deactivate scaler modules, raster generator modules, and/or other modules, as well.

Of course, in various embodiments, it should be noted that the aforementioned commands may each include a plurality of sub-commands (i.e. related commands, etc.). For example, in the context of color transformations, one or more commands may be used to deactivate a color space converter module (e.g. RGB->YCbCr, YCbCr->RGB, etc.), color gamut color space conversion module, chroma/hue/saturation module, gamma/re-gamma look-up table module, etc. Further, in the context of channels, a core channel, a base channel, a cursor channel, and/or an overlay channel may be deactivated, as well as a channel compositor module, etc.

Furthermore, in one embodiment, the second processor 206 may enter a processor reduced power mode when the reduced power mode is entered. In the context of the present description, a processor reduced power mode refers to any mode where a processor is consuming less power than the processor would during a normal operating mode (e.g. during a powered mode, etc.). For example, in one embodiment, the second processor 206 may be deactivated when the reduced power mode is entered. In another embodiment, the second processor 206 may avoid power consumption when the reduced power mode is entered.

In another embodiment, output resources of the second processor 206 may enter an output resources reduced power mode when the reduced power mode is entered. For example, in one embodiment, output resources of the second processor 206 may be deactivated when the reduced power mode is entered. In another embodiment, output resources of the second processor 206 may avoid power consumption when the reduced power mode is entered. In one embodiment, the output resources may be operable for display protocol transformation. For example, in one embodiment, the output resources may be capable of transforming scan out data from a head.

The link 210 coupled between the first head 204 of the first processor 202 and the second head 208 of the second processor 206 may be capable of communicating any type of data. For example, in one embodiment, the data may include pixels. In another embodiment, the data may include synchronization data (e.g. to synchronize the processors, etc.). In another embodiment, the data may include image data. In yet another embodiment, the data may include all of the above, at the same time.

In one embodiment, the link 210 may be disabled when the reduced power mode is entered. Further, in one embodiment, the reduced power mode may be entered as a function of an execution of a user application. For example, the user application may indicate that only one processor is required. Accordingly, the second head 208 may enter the reduced power mode. As another example, the user application may not require processing resources other than the first processor 202. Accordingly, the second head 208 may enter the reduced power mode. As an option, the first head 204 may also enter the reduced power mode, such that the heads on multiple (e.g. all, etc.) processors enter the reduced power mode and, as a consequence, some processors may enter a further reduced power mode if they end up being unused, as mentioned earlier.

In another embodiment, the reduced power mode may be entered as a function of an enablement of a surround mode or a mosaic mode. In the context of the present description, surround mode refers to a mode of operation operable to cause the display of an image across multiple horizontally placed displays (e.g. 3, etc.), as one image (e.g. see FIG. 7, etc.). Mosaic mode refers to a mode of operation operable to cause the display of an image across multiple displays as a mosaic, such that the image is displayed as one image (e.g. see FIG. 7, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
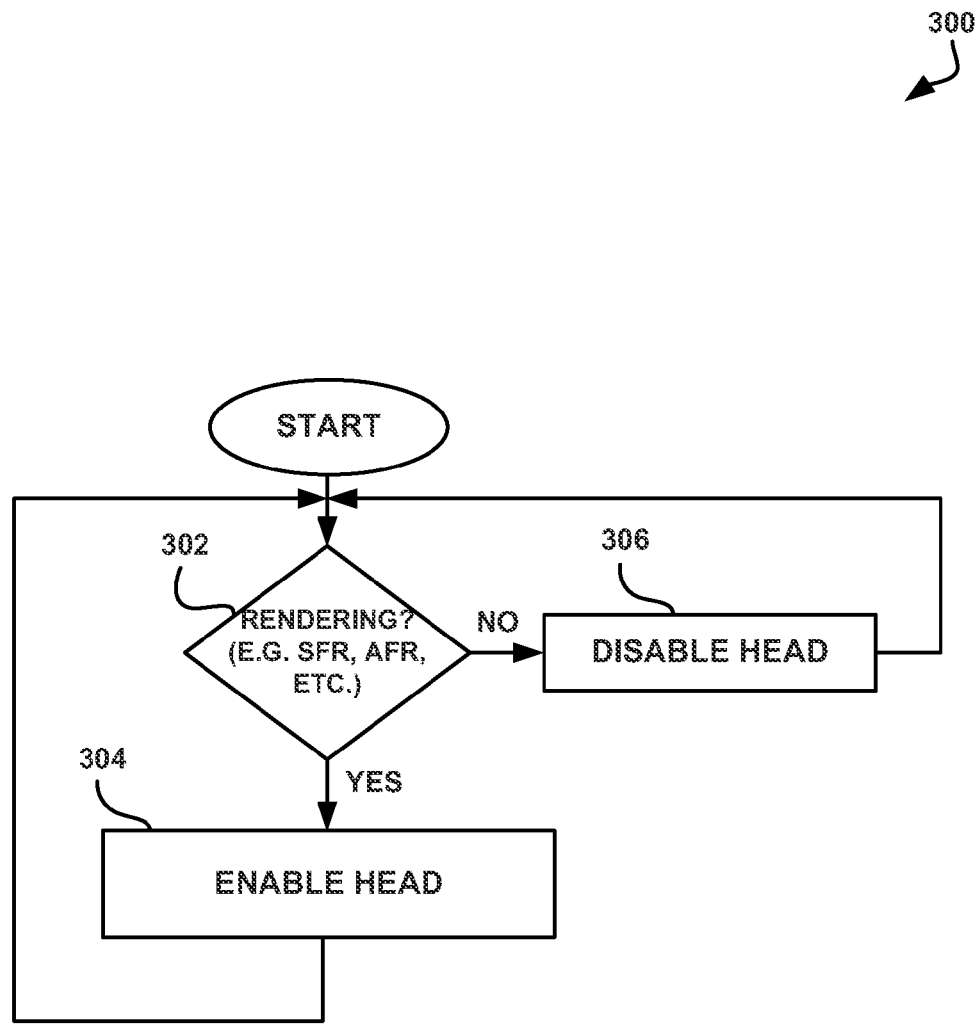
FIG. 3 shows a method for allowing a head to enter a reduced power mode, in accordance with one embodiment.

FIG. 3 shows a method 300 for allowing a head to enter a reduced power mode, in accordance with one embodiment. As an option, the present method 300 may be implemented in the context of the functionality and architecture of the previous Figures and/or any subsequent Figure(s). Of course, however, the method 300 may be carried out in any desired environment. It should also be noted that the aforementioned definitions may apply during the present description.

As shown in FIG. 3, it is determined whether image rendering is being performed. See decision 302. In one embodiment, a master processor (and/or software associated therewith) may determine whether rendering is being performed. In another embodiment, a slave processor (and/or software associated therewith) may determine whether rendering is being performed. In another embodiment, a user application may determine whether rendering is being performed.

If it is determined that rendering is not being performed, a head associated with one or more processors may be disabled. See operation 306. In one embodiment, the head(s) may enter a reduced power mode. Additionally, in one embodiment, the head(s) may be powered off completely. Further, in various embodiments, other components associated with the head(s) may enter a reduced power mode and/or be disabled. Such components include associated processors, associated output resources, associated links, and/or various other components.

If it is determined that rendering is being performed, the head may remain enabled (or be enabled if currently disabled). See operation 304. Similarly, in one embodiment, other components associated with the head(s) may be enabled.

In some multi-GPU systems used for distributed rendering (e.g. SLI, etc.), the GPUs may be connected via a video bridge. In some cases, the video bridge interfaces may be used to perform distributed rendering. For example, the video bridge may be utilized to transfer rendered pixels to the GPU that is connected to a display (e.g. this may be accomplished utilizing a display interface, etc.). As another example, the video bridge may allow synchronization between the GPUs (e.g. this may be accomplished through a General Purpose Input/Output (GPIO) interface, etc.).

In some cases, distributed rendering may be used when GPUs share the rendering of a 3D application. In some cases, however, distributed rendering is not required. Accordingly, in one embodiment, in order to save power and/or conserve resources, the video bridge interfaces may only be enabled when utilized (e.g. when rendering a 3D application, etc.).

In various embodiments, the rendering may include Split Frame Rendering (SFR) and/or Alternate Frame Rendering (AFR). In the case of Split Frame Rendering, a rendered image may be analyzed to split the workload between multiple processors (e.g. to split the workload 50/50 between two graphics processors, etc.). In the case of Alternate Frame Rendering, each processor may render entire frames in sequence (e.g. one GPU processes even frames, and a second GPU processes odd frames, one after the other, etc.). In one embodiment, when a processor (e.g. a slave processor, etc.)

finishes work on a frame (or part of a frame), the results may be sent via an SLI bridge to a master processor, which may then output the completed frames.

In another embodiment, multiple processors may split antialiasing tasks. For example, the antialiasing workload may be split between two graphics cards. In one embodiment, one processor may perform an antialiasing pattern which is slightly offset to the usual pattern (e.g. slightly up and to the right, etc.), and a second processor may use a pattern offset by an equal amount in the opposite direction (e.g. down and to the left, etc.). The results may then be composited. Accordingly, in one embodiment, if the antialiasing workload is not to be split between processors, it may be determined that one or more heads enter the reduced power mode. Of course, in one embodiment, an application may indicate when to enter the reduced power mode.

Figure 4:
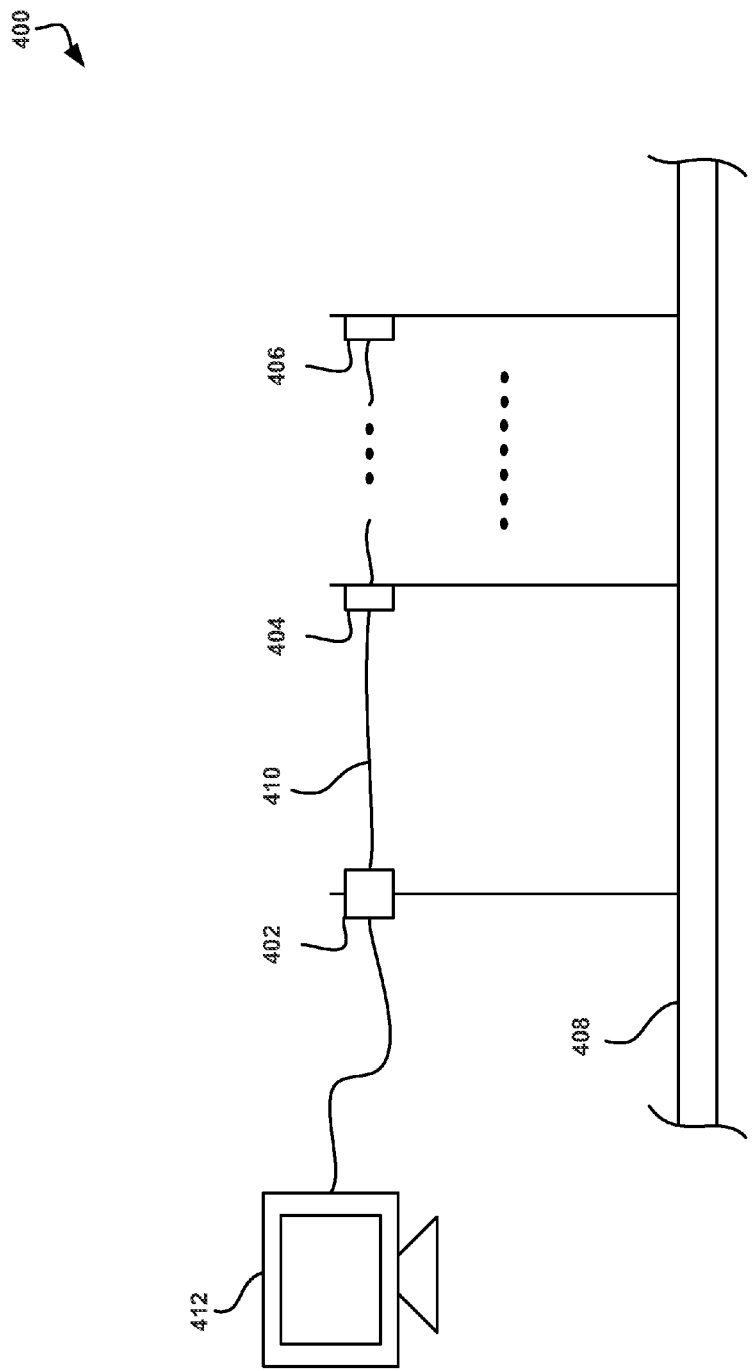
FIG. 4 shows a system for allowing a head to enter a reduced power mode, in accordance with one embodiment.

FIG. 4 shows a system 400 for allowing a head to enter a reduced power mode, in accordance with one embodiment. As an option, the system 400 may be implemented in the context of the previous Figures and/or any subsequent Figure(s). Of course, however, the system 400 may be implemented in any desired environment. It should also be noted that the aforementioned definitions may apply during the present description.

As shown, a first graphics processor including a first head 402 is in communication with a second graphics processor including a second head 404 via a link 410 (e.g. a video bridge, etc.). In various embodiments, the link 410 may include a flexible or hard wire or set of wires capable of allowing data exchange (e.g. synchronization signals, pixel data, etc.) between the first processor and the second processor. As shown further, the system 400 may include one or more other graphics processors each including at least one head 406. It should be noted that that any link (e.g. video bridge, etc.) may connect any set of processors. For example, in the case of three processors including processor_1, processor_2, and processor_3; connections may include, for instance, as follows: processor_1→processor_2, processor_1→processor_3, and processor_2→processor_3, etc.

In one embodiment, the graphics processors may be coupled to a motherboard 408. In another embodiment, one or more of the graphics processors may be on separate motherboards. In various embodiments, one or more of the heads 402-406 may be in communication with one or more displays 412.

In operation, one or more applications may utilize functionality associated with one or more of the graphics processors (e.g. to render images, etc.). In one embodiment, the graphics processors may coordinate and/or split work between the graphics processors (e.g. during SFR operation, AFR operation, split antialiasing operation, etc.). When the second graphics processor is not required (e.g. by an application, etc.), in one embodiment, the second head 404 may enter a reduced power mode, thereby effectively disabling the link 410. Similarly, in one embodiment, the head 406 associated with another processor may be placed in a reduced power mode when it is determined that the associated processor is not required. Still yet, at least a portion of the first head 402 (e.g. that drives the link 410, etc.) may also enter a reduced power mode. In such embodiment, one or more other portions of the first head 402 (e.g. that drive a display, etc.) may remain activated.

Once the second head 404 enters the reduced power mode, the first head 402 (and the first processor, etc.) may stay in a normal power mode such that data may be displayed on the one or more displays 412. When it is determined that the second processor is needed (e.g. based on a signal, based on resource usage, based on an application requirement, etc.), the second head 404 may enter a normal power mode, such that the link 410 is active and data exchange between the first graphics processor and the second graphics processor may occur. In one embodiment, when a head enters a reduced power mode, corresponding hardware may also enter a reduced power mode (e.g. a corresponding processor, corresponding output resources, etc.).

Figure 5:
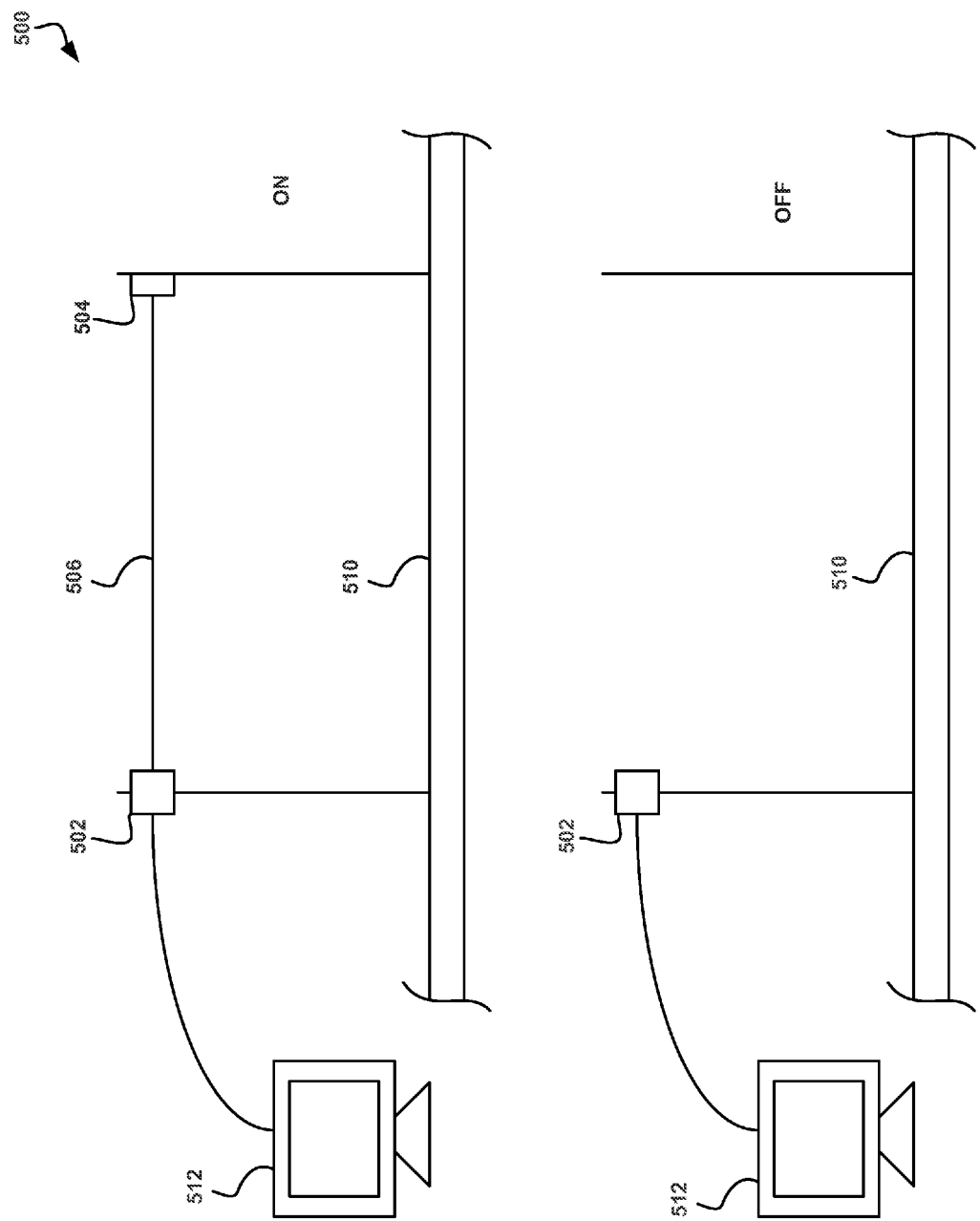
FIG. 5 illustrates a logical diagram for a system before and after a head enters a reduced power mode, in accordance with one embodiment.

FIG. 5 illustrates a logical diagram for a system 500 before and after a head enters a reduced power mode, in accordance with one embodiment. As an option, the system 500 may be implemented in the context of the previous Figures and/or any subsequent Figure(s). Of course, however, the system 500 may be implemented in any desired environment. It should also be noted that the aforementioned definitions may apply during the present description.

As shown, a first graphics processor including a first head 502 is in communication with a second graphics processor including a second head 504 via a link 506 (e.g. a video bridge, etc.). In one embodiment, the graphics processors may be coupled to a motherboard 510.

In operation, one or more applications may utilize functionality associated with the graphics processors (e.g. to render images, etc.). In one embodiment, the graphics processors may coordinate and/or split work between the graphics processors (e.g. during SFR operation, AFR operation, split antialiasing operation, etc.), such that the first head 502 and the second head 504 are operating in a normal power mode (e.g. shown as "ON" in FIG. 5, etc.). When the second graphics processor is not required (e.g. by an application, etc.), the second head 504 may enter a reduced power mode, thereby effectively disabling the link 506 (e.g. shown as "OFF" in FIG. 5, etc.). As noted, in one embodiment, hardware associated with the head may also enter a reduced power mode when the head enters the reduced power mode. As also noted above, at least a portion of the first head 502 (e.g. that drives the link 506, etc.) may also enter a reduced power mode. In such embodiment, one or more other portions of the first head 502 (e.g. that drive a display, etc.) may remain activated.

Figure 6:
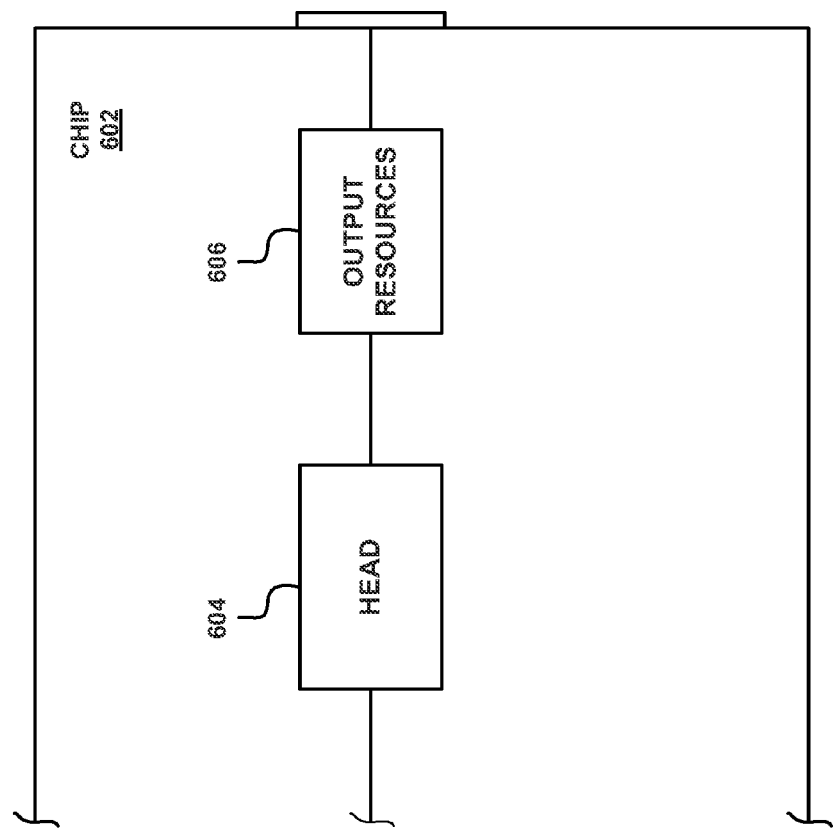
FIG. 6 shows an apparatus for allowing a head to enter a reduced power mode, in accordance with one embodiment.

FIG. 6 shows an apparatus 600 for allowing a head to enter a reduced power mode, in accordance with one embodiment. As an option, the apparatus 600 may be implemented in the context of the previous Figures and/or any subsequent Figure(s). Of course, however, the apparatus 600 may be implemented in any desired environment. It should also be noted that the aforementioned definitions may apply during the present description.

As shown, the apparatus 600 may include a chip 602 associated with a processor (e.g. a GPU, a CPU, etc.). In various embodiments, the chip 602 may include various hardware and software components, including one or more heads such as head 604, one or more output resources 606, processing circuitry, a General Purpose Input/Output (GPIO) interface, and/or other hardware. It should be noted that, in one possible embodiment, there may be multiple heads and multiple output resources, with an optional crossbar (not shown) enabling any head to be connected to any output resource. It should also be noted that, in still other optional embodiments, the output resource(s) may optionally be built into the head 604.

In operation, the head 604 may be capable of entering a reduced power mode (e.g. when resources associated with the chip 602 are not required, etc.). Furthermore, in various embodiments, any components of the chip 602, including the chip 602, output resources 606, etc. may enter a reduced power mode, upon the head 604 entering a reduced power mode. In this way, overall system power may be conserved when a processor associated with the chip 602 is not used. For example, in one embodiment, the reduced power mode may be entered when a system is not in a mosaic mode or a surround mode. While not shown, it should be understood that, in other embodiments, the apparatus 600 may include multiple heads and/or multiple output resources, etc.

Figure 7:
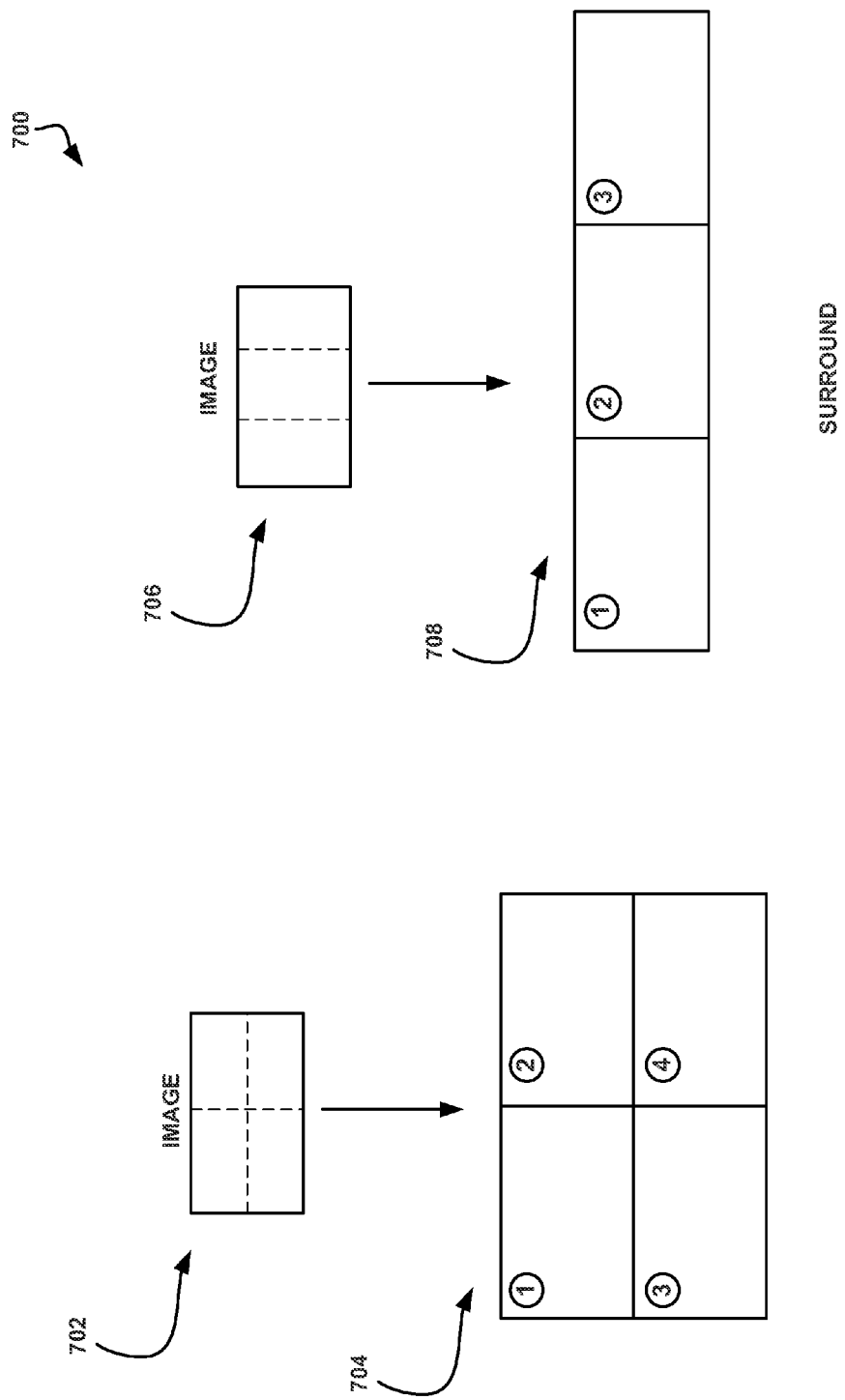
FIG. 7 shows an example diagram of a mosaic mode operation and a surround mode operation, in accordance with one embodiment.

FIG. 7 shows an example diagram 700 of a mosaic mode operation and a surround mode operation, in accordance with one embodiment. As an option, the diagram 700 may be viewed in the context of the previous Figures and/or any subsequent Figure(s). Of course, however, the diagram 700 may be viewed in the context of any desired environment. It should also be noted that the aforementioned definitions may apply during the present description.

As shown, in mosaic mode, an image 702 is capable of being displayed on multiple displays 704 (e.g. four, etc.) seamlessly, such that regions of the image 702 are displayed on the multiple displays 704 as the original image. In one embodiment, two or more GPUs may be utilized to render images in mosaic mode. In this case, pixel data and/or synchronization data may be communicated between heads (e.g. via a video bridge, etc.), when the heads are in normal power mode.

As shown further, in surround mode, an image 706 is capable of being displayed on multiple displays 708 (e.g. three, etc.) seamlessly, such that regions of the image 706 are displayed on the multiple horizontally placed displays 708 as the original image (e.g. in a 3-dimensional manner, etc.). In one embodiment, two or more GPUs may be utilized to render images in surround mode. In this case, pixel data and/or synchronization data may be communicated between heads (e.g. via a video bridge, etc.), when the heads are in normal power mode.

In the case that a currently used application (or a currently executed process, etc.) does not require more than one processor (e.g. a surround mode is not in use, a mosaic mode is not in use, etc.), a head associated with the processor may enter a reduced power mode. In one embodiment, a driver may cause the head to enter the reduced power mode.

Figure 8:
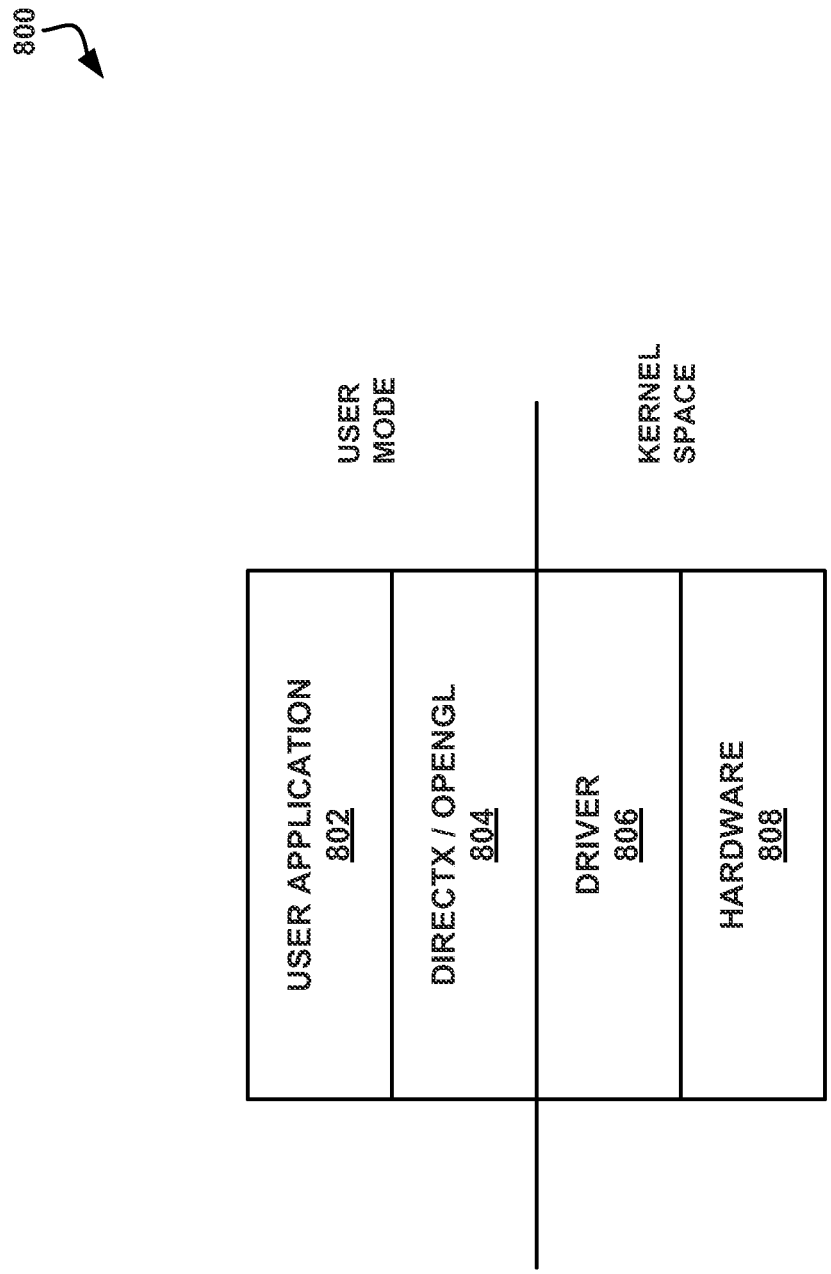
FIG. 8 shows a block diagram of components capable of being utilized to cause hardware to enter a reduced power mode, in accordance with one embodiment.

FIG. 8 shows a block diagram 800 of components capable of being utilized to cause hardware to enter a reduced power mode, in accordance with one embodiment. As an option, the diagram 800 may be viewed in the context of the previous Figures and/or any subsequent Figure(s). Of course, however, the diagram 800 may be viewed in the context of any desired environment. It should also be noted that the aforementioned definitions may apply during the present description.

In operation, a user application 802, which may utilize or access a DirectX and/or an OpenGL software module 804, may require (or desire) the use of multiple graphics processors to implement application functionality. Accordingly, a driver 806 may be utilized to control hardware 808 such that the multiple graphics processors are used. Similarly, in the case the user application 802 does not require the use of multiple graphics processors, the driver 806 may cause all or some of the hardware 808 to enter a reduced power mode.

For example, in one embodiment, the driver 806 may cause a second head (and/or any head, for that matter, that is driving the link, etc.) to enter a reduced power mode, thereby effectively eliminating a link between a first head and the second head. Similarly, in another embodiment, in addition to causing the second head to enter a reduced power mode, the driver 806 may cause a processor and/or output resources to enter the reduced power mode. In various embodiments, the hardware 808 may include any hardware associated with a processor (e.g. a GPU, etc.).

Figure 9:
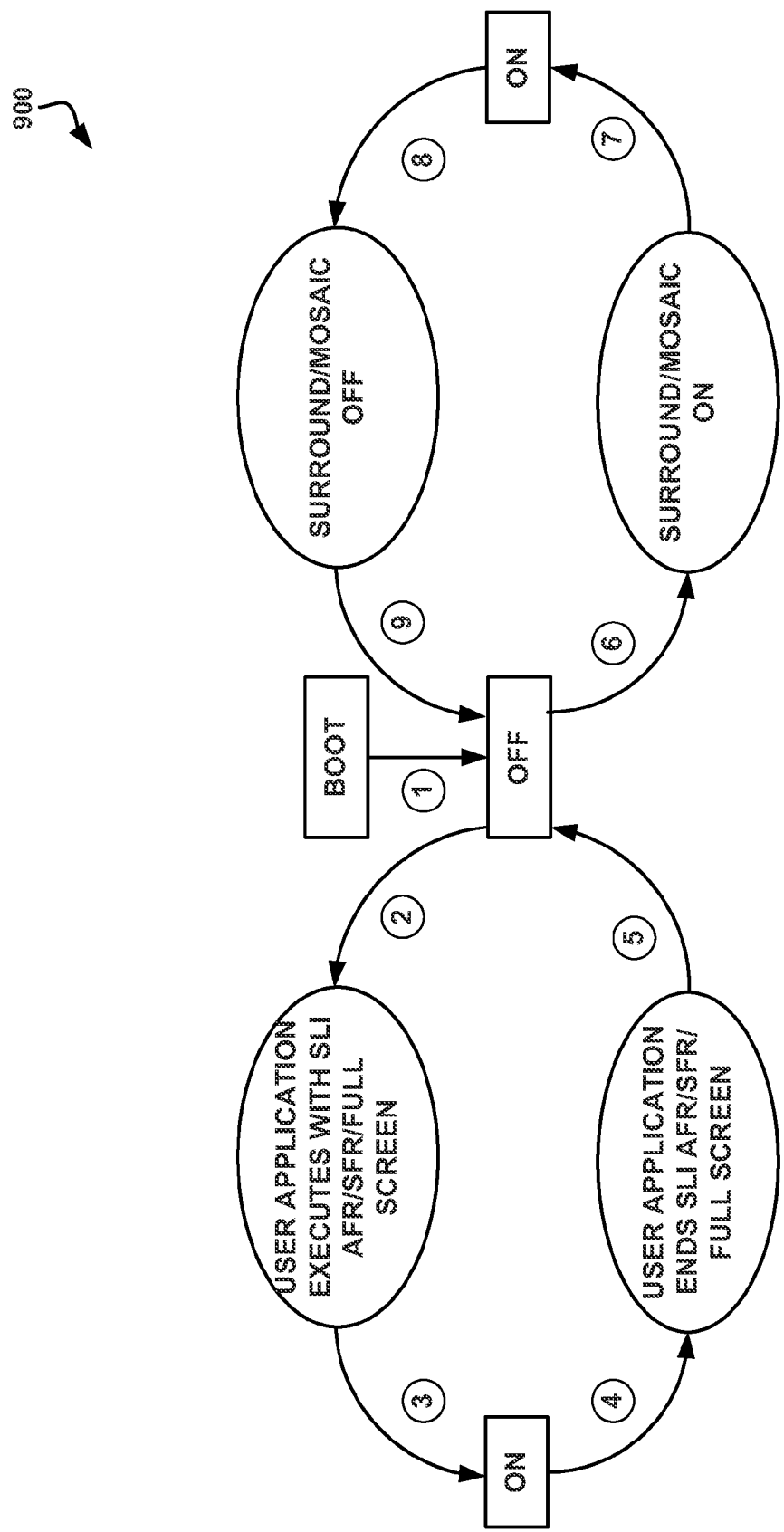
FIG. 9 shows system flow diagram for allowing a head to enter a reduced power mode, in accordance with one embodiment.

FIG. 9 shows system flow diagram 900 for allowing a head to enter a reduced power mode, in accordance with one embodiment. As an option, the diagram 900 may be viewed in the context of the previous Figures and/or any subsequent Figure(s). Of course, however, the diagram 900 may be viewed in the context of any desired environment. It should also be noted that the aforementioned definitions may apply during the present description.

As shown, upon system boot, a second head may be in a default reduced power mode, as indicated by "OFF" in FIG. 9. See Step 1. Upon execution of a user application that utilizes SLI AFR or SLI SFR, and full screen mode, etc., the second head enters a normal operating mode (e.g. as indicated by "ON" in FIG. 9, etc.), such that a second processor may be utilized to process data along with a first processor. See Steps 2-3. Once the user application ends SLI AFR, SLI SFR, or full screen mode, the second head enters a reduced power mode, such that a link between the first head and the second head is effectively disabled. See Steps 4-5. While full screen mode is described in the context of the present embodiment, it should not be construed as limiting in any manner, i.e. non-full screen mode operation (e.g. windowed mode, etc.) is contemplated, as well.

Similarly, if after a system boot, a surround mode or a mosaic mode is utilized, the second head may enter a normal operating mode (e.g. as indicated by "ON" in FIG. 9, etc.), such that the second processor may be utilized to process data along with the first processor. See Steps 6-7. Once the surround mode or the mosaic mode is ended, the second head enters the reduced power mode, such that the link between the first head and the second head is effectively disabled. See Steps 8-9.

Figure 10:
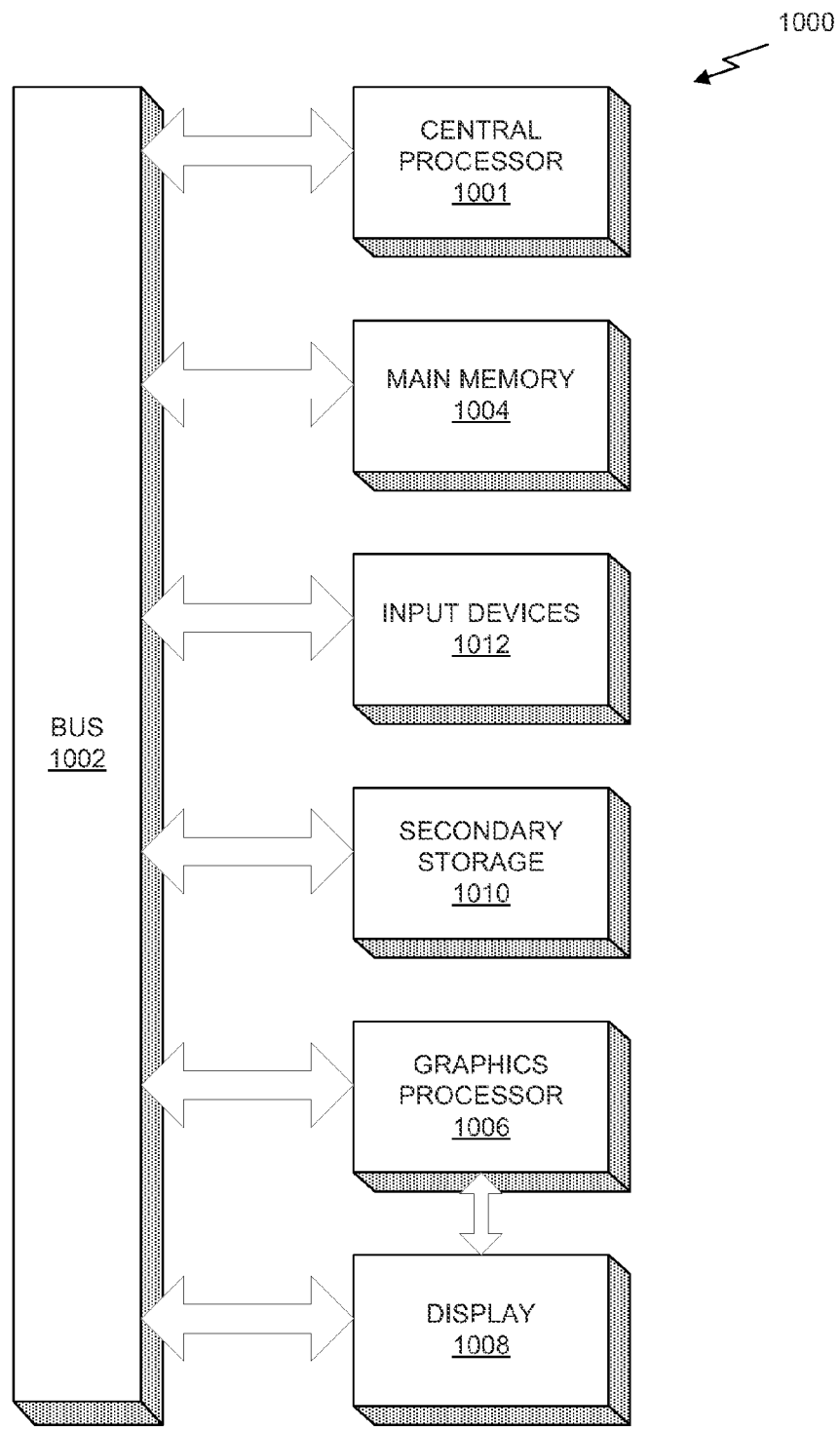
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 1004 and/or the secondary storage 1010. Such computer programs, when executed, enable the system 1000 to perform various functions. The main memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a first processor having a head;
a second processor having a head; and
a link coupled between the head of the first processor and the head of the second processor for communicating first data therebetween;
wherein the apparatus is operable such that the head of the second processor is capable of entering a head reduced power mode corresponding to the second processor, while at least a portion of the head of the first processor is configured in a reduced power mode and while one or more other portions of the head of the first processor is not configured in the reduced power mode.

2. The apparatus of claim 1, further comprising a third processor having a head; and
another link coupled between the head of the second processor and the head of the third processor for communicating second data therebetween;
wherein the apparatus is operable such that the head of the third processor is capable of entering a head reduced power mode corresponding to the third processor.

3. The apparatus of claim 1, wherein the apparatus is operable such that the head of the first processor is also capable of entering a head reduced power mode corresponding to the first processor.

4. The apparatus of claim 1, wherein the apparatus is operable such that the head of the second processor avoids power consumption when the head reduced power mode corresponding to the second processor is entered.

5. The apparatus of claim 1, wherein the apparatus is operable such that a plurality of commands are issued when the head reduced power mode corresponding to the second processor is entered.

6. The apparatus of claim 5, wherein the apparatus is operable such that the plurality of commands include at least one of:
a first command for deactivating a plurality of channels associated with the head of the second processor, a second command for deactivating a cursor in association with the head of the second processor, a third command for deactivating color transformation in association with the head of the second processor, or a fourth command for deactivating data scan out from memory.

7. The apparatus of claim 1, wherein the apparatus is operable such that one or more of the first processor and the second processor enters a processor reduced power mode when the head reduced power mode corresponding to the one or more of the first processor and the second processor is entered.

8. The apparatus of claim 1, wherein the apparatus is operable such that one or more output resources of the second processor enters an output resource reduced power mode when the head reduced power mode corresponding to the second processor is entered.

9. The apparatus of claim 1, wherein the apparatus is operable such that output resources of the second processor are operable for display protocol transformation when the head reduced power mode corresponding to the second processor is entered.

10. The apparatus of claim 1, wherein the apparatus is operable such that the head reduced power mode corresponding to the second processor is entered as a function of an execution of a user application.

11. The apparatus of claim 1, wherein the apparatus is operable such that the head reduced power mode corresponding to the second processor is entered as a function of a disablement of a surround mode or a mosaic mode.

12. The apparatus of claim 1, further comprising a first board to which the first processor is coupled and a second board to which the second processor is coupled.

13. The apparatus of claim 1, further comprising a single board to which the first processor and the second processor are coupled.

14. The apparatus of claim 1, wherein the first data includes pixels.

15. The apparatus of claim 14, wherein the first processor includes a first graphics processor and the second processor includes a second graphics processor.

16. A computer program product embodied on a non-transitory computer readable medium, comprising:
code for controlling a system including a first processor having a head, a second processor having a head, and a link coupled between the head of the first processor and the head of the second processor for communicating data therebetween;
wherein the computer program product is operable such that the head of the second processor is capable of entering a head reduced power mode corresponding to the second processor, while at least a portion of the head of the first processor is configured in a reduced power mode and while one or more other portions of the head of the first processor is not configured in the reduced power mode.

17. The computer program product of claim 16, wherein the computer program product is operable such that a plurality of commands are issued when the head reduced power mode corresponding to the second processor is entered.

18. The computer program product of claim 17, wherein the computer program product is operable such that the plurality of commands include at least one of:
a first command for deactivating a plurality of channels associated with the head of the second processor, a second command for deactivating a cursor in association with the head of the second processor, a third command for deactivating color transformation in association with the head of the second processor, or a fourth command for deactivating data scan out from memory.

19. A method, comprising:
controlling a system including a first processor having a head, a second processor having a head, and a link coupled between the head of the first processor and the head of the second processor for communicating data therebetween;
under the control, prompting the head of the second processor to enter a head reduced power mode corresponding to the second processor, while at least a portion of the head of the first processor is configured in a reduced power mode and while one or more other portions of the head of the first processor is not configured in the reduced power mode.

20. The method of claim 19, the head of the second processor avoids power consumption when the head reduced power mode corresponding to the second processor is entered.

* * * * *